(No Model.) 3 Sheets—Sheet 1.
A. W. MESTON.
ELECTRIC METER.
No. 442,705. Patented Dec. 16, 1890.
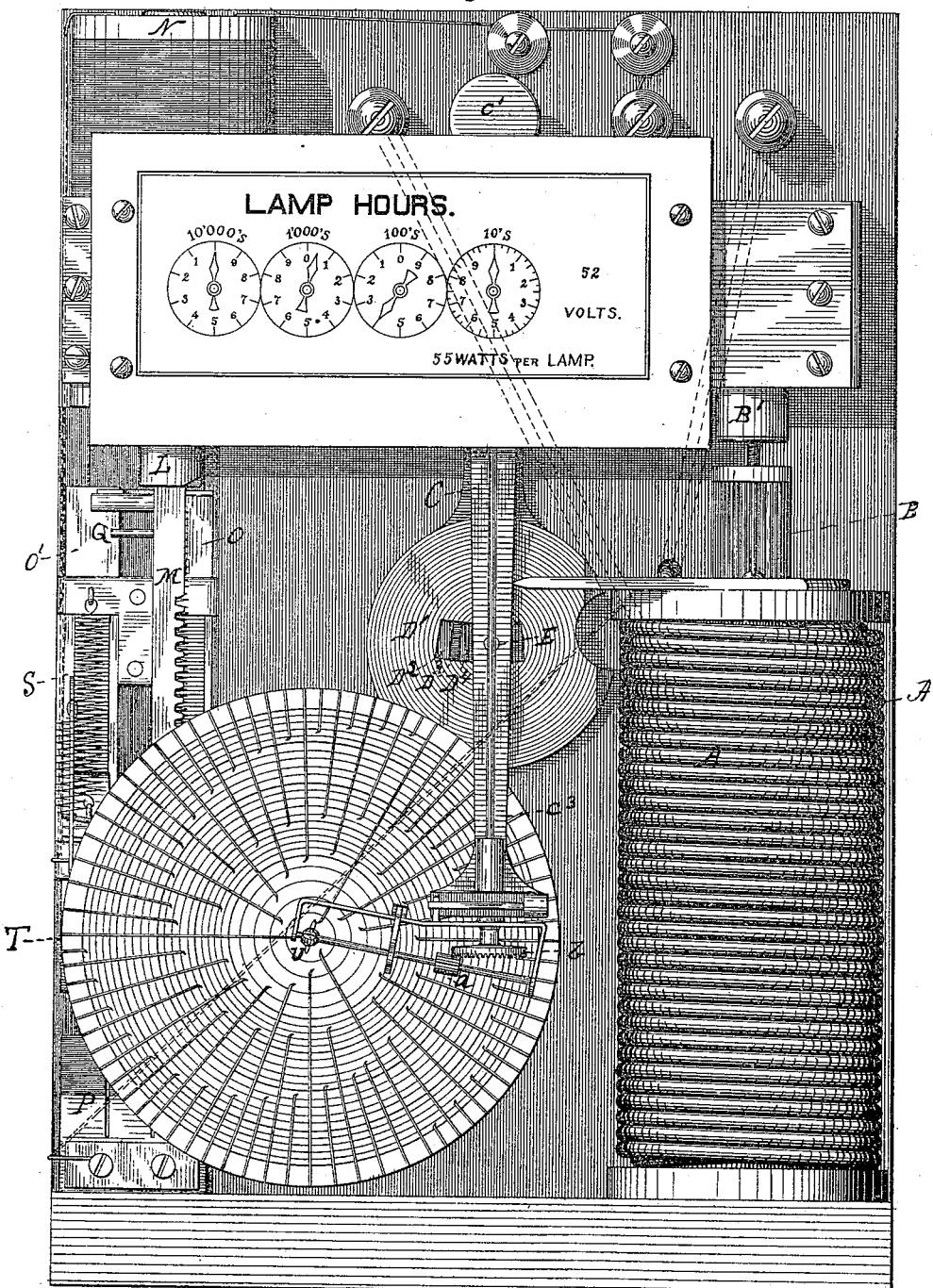
Fig. I.
Attest: Inventor:
Alexander W. Meston

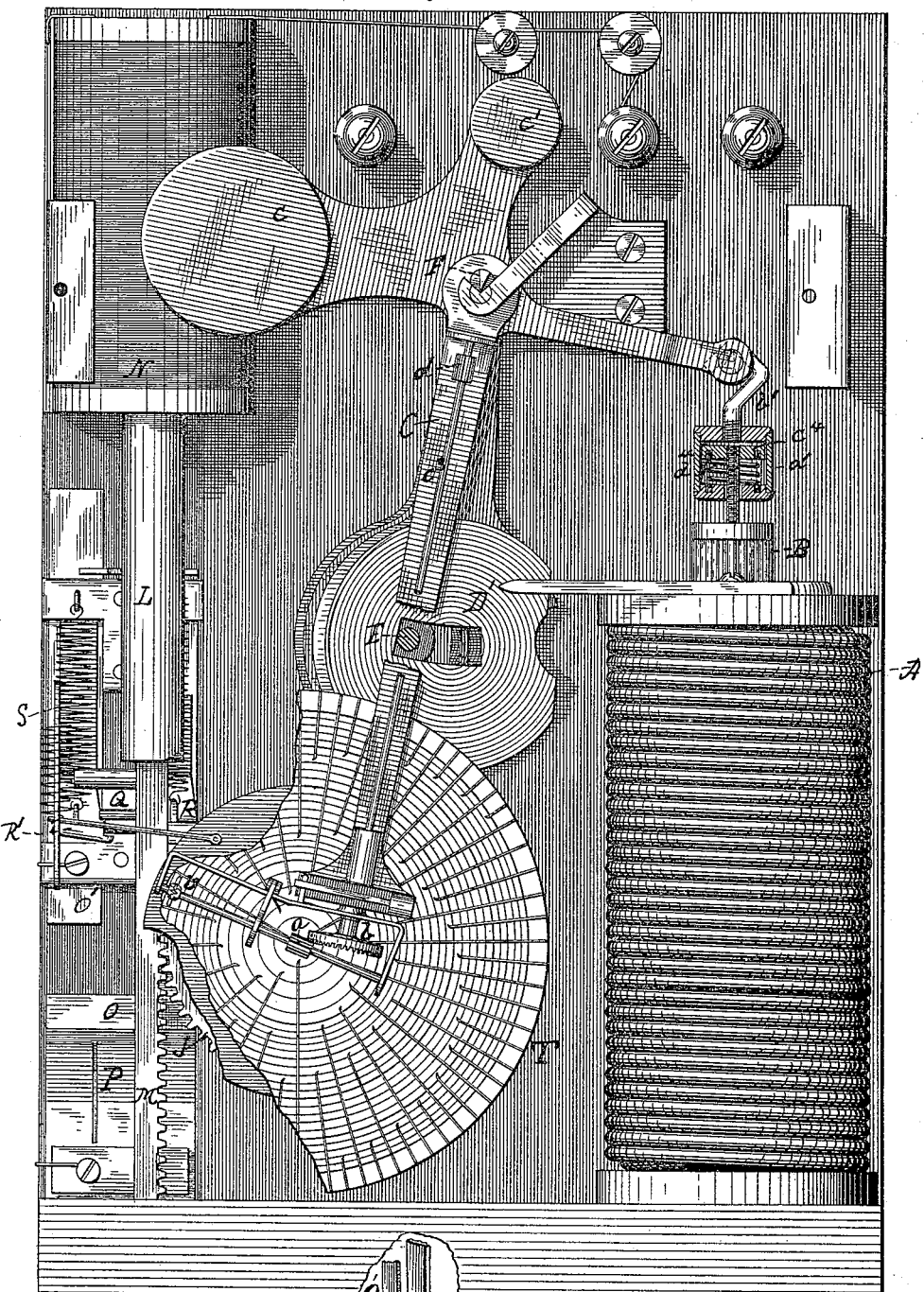

(No Model.)
A. W. MESTON.
ELECTRIC METER.
No. 442,705.
3 Sheets—Sheet 3.
Patented Dec. 16, 1890.
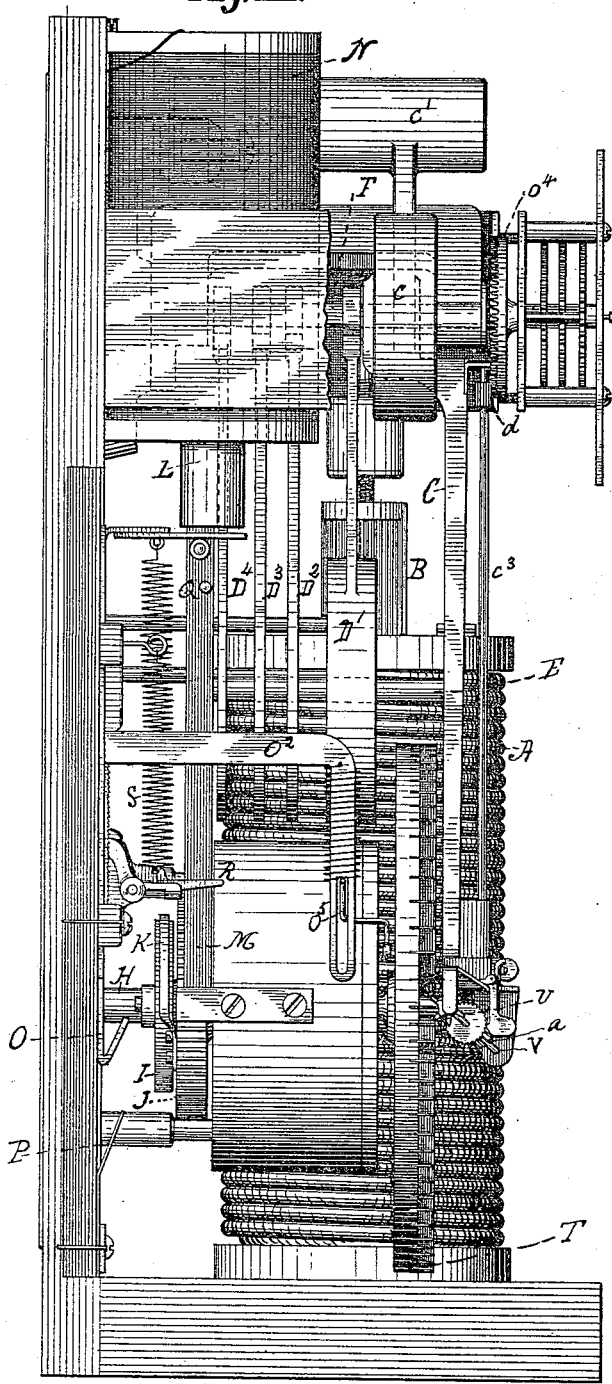
*Fig. III.*
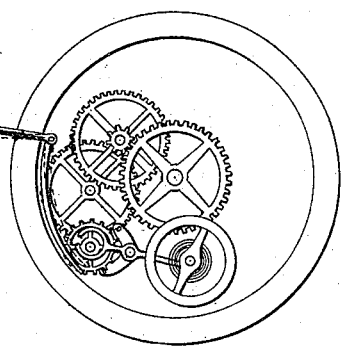
*Fig. IV.*
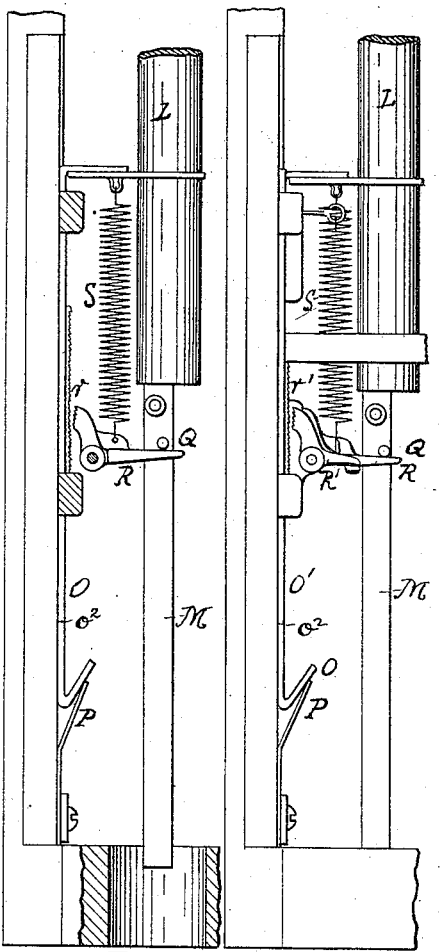
*Fig. V.    Fig. VI.*
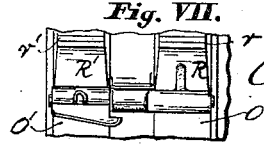
*Fig. VII.*
Attest:
F. W. Ritter Jr
F. W. Eaton
Inventor:
Alexander W. Meston

UNITED STATES PATENT OFFICE.

ALEXANDER W. MESTON, OF ST. LOUIS, MISSOURI, ASSIGNOR TO THE EMERSON ELECTRIC MANUFACTURING COMPANY, OF SAME PLACE.

ELECTRIC METER.

SPECIFICATION forming part of Letters Patent No. 442,705, dated December 16, 1890.

Application filed July 22, 1890. Serial No. 359,527. (No model.)

*To all whom it may concern:*

Be it known that I, ALEXANDER W. MESTON, a citizen of the United States, residing at St. Louis, in the State of Missouri, have invented certain new and useful Improvements in Electric Meters; and I hereby declare the following to be a full, clear, and exact description, reference being had to the accompanying drawings, wherein—

Figure I is a front elevation of an improved form of my meter with register in position. Fig. II is a similar view with the registering devices removed. Fig. III is a side elevation of the devices shown in Fig. 1. Fig. IV is a detached view of escapement mechanism for controlling the shaft of the radial gear-wheel T. Figs. V and VI are detailed views of the contact-strip, core L, rack M, &c., whereby the shaft of the radial gear-wheel T is driven. Fig. VII is a detail front view of the dogs which control the contact-strip and the escapement trip or detent. Fig. VIII is a detached view of the lower ends of the contact-strip O and the strip O', which stops the escapement mechanism.

My invention relates to electric meters and instruments for measuring the product of the quantity of an electric current by the time during which it flows; and the objects of my invention are to provide a direct-reading electric meter which shall be accurate throughout the entire range, and accurate especially for small initial quantities of the current.

My invention consists of three general features or parts, to wit: a device for measuring the quantity or strength of the current, a device for producing a motion of uniform speed, and a device for registering by means of these two devices the product of the current strength and time.

I am aware that there are meters which comprise, broadly speaking, these three features, and I do not claim them, broadly; but I claim new and useful improvements in all three devices and in the manner of their combination and employment to gain the objects of my invention, and for the sake of clearness I shall specify them separately.

The objects of my improvements in the device for measuring the strength of the current are to make the indications for each unit of current strength absolutely definite, and to make the indication for the initial units as large or larger than for the increment of the same unit after the strength of the current is considerable.

Referring to Figs. I and II, wherein I have shown my improved current-measuring device in connection with the meter, A is a solenoid helix of any well-known construction; B is a magnetic core, which should be laminated if used with alternating currents. C is a lever pivoted upon the knife-edges formed on the lower side of the shaft F, and $D' D^2 D^3 D^4$ are weights hanging upon knife-edges formed on the upper side of the shaft F. (See dotted lines, Fig. III.) $c$ and $c'$ are weights to counterbalance the solenoid-core B and the lower arm of the lever C.

The current to be measured is conducted around the helix A. The lever C is balanced to hang in a vertical position, as shown in Fig. I, when no current is passing through the helix A, and is weighted so that the first unit of current, however small, will by the sucking in of the core B tip the lever C until the pin E comes in contact with the lightest pendent weight $D^4$. The weight $D^4$ is so proportioned that when the current is increased by any certain amount, which may or may not be the same as the initial quantity, the lever C will in like manner be tipped till the pin E touches the weight $D^3$. Continuing in the same way, any desired number of weights may be employed.

In practice it is found that for the purposes of the meter it is necessary to provide only three of four pendent weights, corresponding to the first four or five increments of current, the last weight $D'$ being made heavy enough to counterbalance the pull of whatever current may pass through the helix A up to the capacity of the meter. In this way I can get any desired movement for any given increment of current.

B' is a flexible hanger interposed between the solenoid-core B and the lever C to take up the vibration caused by the rapid reversals of the current when the meter is employed for measuring an alternating current and to prevent the transmission of such vibration to the lever C and its adjuncts. It consists of the case or stirrup $a'$, to which is fastened the suspension-hook $b'$, the overhanging piece $c^4$ having an annular groove in the under surface to form a seat for the spring $d^4$, and a rod or bolt attached to the piece $c^4$, which passes through the case or stirrup $a'$ and is secured to the core B. By this or equivalent means the vibrations of the core B, caused by the alternations of the current are taken up by the spring $d^4$.

The device which I employ for producing a movement of uniform speed is essentially a gravity-motor, whose speed may be governed either by an escapement or any other well-known form of governor. This motor consists of the shaft H, to which is fastened the ratchet-wheel I, the toothed wheel J being mounted loosely on said shaft free to revolve thereon in one direction, but being kept from revolving in the opposite direction, excepting with the said shaft, by means of the pawl K and the said ratchet-wheel I. The shaft H is caused to revolve by means of the weight of the solenoid-core L and rack M, the teeth of which latter engage in the toothed wheel J. The shaft H is restrained by an escapement or other governing device, which is shown in Fig. IV, and as its construction and application are well understood by those versed in the art to which this device belongs I do not here describe it. The said shaft H continues to revolve at a uniform rate of speed until the end of the rack M is reached, at which point the shaft H would stop unless some means were provided for raising the weight L and rack M. This means I have provided in the solenoid N and contact-strip O and P. When the solenoid-core L and rack M sink a certain distance, the pin Q trips the lever-dog R, which holds the contact O from falling and making connection with the contact-strip P. This allows contact to be made between the strips O and P, energizing the solenoid N, and this in turn sucks up the core L and rack M until the pin Q, engaging with the bent-over end of the strip O carries the strip O up with it, and in so doing breaks the circuit which energizes the solenoid-helix. The contact-strip O is retained in this position by the lever-dog R, and the weight is left free to drive the shaft H until it again sinks down and the same series of operation recurs. By this means the shaft H is kept revolving so long as energy is supplied to suck up the core of the solenoid when contact is made between the strips O and P. This energy may be supplied from a battery or from the source from which flows the current being measured.

Figs. V and VI show the arrangement of the contact-making device detached from the meter. O is the movable contact-strip, free to slide up and down when the dog R is tripped and free to be pushed up at all times. O' is another strip free to move up and down in the same manner and held up by the dog R'. The special function of this strip O' will be explained later on. The dog R engages in the rack $r$, which extends along the strip O a distance equal to the distance through which the strip is capable of moving. By this provision the dog R engages in the rack and retains the strip O in whatever position it may happen to stop, which position will vary with the strength of the current employed to energize the solenoid N. This enables the device to operate under large variations of current and renders it reliable under all conditions. The strip O may be allowed to fall by its own weight or it may be assisted by the spring S, which also retains the dog R against the rack $r$.

If an escapement-governor is employed, it is necessary to provide some means which shall insure the starting of the escapement mechanism in case the motor should stop by reason of failure to supply current to suck up the solenoid-core L. This might often occur during interruptions in the operation of the current-supplying machinery. By means of the strip O' and dog R' this is accomplished. When the dog R is tripped by the pin Q and contact is made between O and P, if there is no current to energize the solenoid N and suck up the core L and rack M, the said core L and rack M continue to sink down until by suitable means, as shown, or otherwise, the dog R' is tripped and the strip O' falls, and the arm $O^2$ thereon, or an equivalent device, moves the pawl $O^5$, (see Fig. IV,) stopping the escapement in such a position as to insure its starting as soon as the current is supplied to the solenoid. In order that this strip O' shall be raised to its first position when the current is supplied to the solenoid N, the contact-strip O (see Fig. VIII) is formed with a ledge or shoulder $o^2$, which engages or takes under the lower end of strip O' and carries said strip up with it. The strip O' is thus carried by the contact-strip O, and is retained, like O, by the dog R' and rack $r'$.

I do not limit myself to the specific device for making contact and re-energizing the motor, as there are other methods of accomplishing the same result; but I specify this as being the best method at present known to me.

Having now the shaft H moving at a uniform speed and the lever C, which indicates the current of strength, I will explain my device for registering the product of the current strength and the time of its flow. For this purpose I employ a device which I have termed a "radial gear-wheel," (indicated by the letter T.) The construction of the gear-wheel I claim as novel. The gear-wheel T is mounted on the shaft H and revolves with it. The lever C moves in front of this wheel or disk T, (see Figs. I and II), the small pinion U engaging with the teeth of the said radial wheel T. The pinion U, mounted on shaft V, which is carried by the lever C, is caused to revolve by the movement of the radial gear T.

This movement is transmitted by means of the pinion $a$, crown or beveled gear $b$, shaft $c^3$, and pinion $d$ to the usual decimal-registering dials.

From an inspection of the radial gear-wheel T, Fig. I, it will be seen that the number of teeth around the circumference of any given radius is approximately proportional to the said radius, and this arrangement of the teeth I claim as novel. It will be seen that as a feature of said construction the interior ends of the teeth constitute points in a species of spiral running from the center to the outside of the wheel. Along this spiral the pitch of the teeth is constant, and the teeth are also the minimum distance apart. At the center is a space, which is open, as all the teeth stop before coming to the center. It will also be noted that the inner ends of the teeth of the radial gear-wheel T are bent in the direction of the motion of said wheel. This is done to prevent the pinion U from slipping off the ends of the teeth, and is of particular advantage in case of the long teeth which extend near to the center of the disk and first engage when the current is weak.

I do not limit myself to the particular arrangement of teeth, but I consider it preferable, as such an arrangement best utilizes the space of the disk, so as to accomplish the registration uniformly and continuously throughout the entire range of the meter; neither do I limit myself to the disk form of the device, as any surface of revolution may be employed, said surface having teeth increasing in number along the generating-line of said surface in substantially the same manner as the teeth on the disk; but although any such form would accomplish the registration the disk is preferable, as it occupies less space and is better adapted to the application of an oscillating pinion.

When the pinion U is opposite the center, and consequently not engaging with any of the teeth of the wheel T, the lever C is in the position which indicates no current. In this position the shaft V remains stationary and nothing is registered, although the wheel T continues to revolve. When, however, one unit of current—say, for instance, the current necessary for an incandescent lamp—is caused to pass through the helix A, the lever C assumes a position which brings the pinion U away from the center of the wheel T and into engagement with the teeth of the wheel T, the number of which correspond to the distance of the pinion U from the center. Assuming, for example, that at this position the pinion U engages with three teeth and that there are six teeth in the pinion, also that the shaft H and wheel T revolve once an hour, it is evident that so long as one lamp burns, the pinion U and shaft V will revolve once in two hours, and this movement is transmitted with suitable reduction or increase to register upon the dials. One revolution of the hand of a dial, whose speed is reduced to one-fiftieth of that of the shaft V, would indicate one hundred lamp hours. By suitable calculation reading may be made ampère hours, horse-power hours, Watt hours, or any convenient unit of work.

If the current of two lamps be caused to flow through the helix A, the lever C will move the pinion U farther from the center of the wheel T to a position where it engages with six teeth of the wheel T. The speed of the shaft V will now be doubled and the reading will be doubled for a given time. In the same way any increase of current passing through the helix A moves the pinion to a position where it engages with a correspondingly-greater number of teeth on the wheel T, and thus the speed of the shaft V will be proportional to the current strength. I have assumed the above numbers of teeth and rates of movement merely for definite illustration, as it will be seen that any other numbers or rates can be employed, the correct registering being effected by suitable increases or reductions.

The decimal-registering dials may be placed as shown in the drawings, or they may be fastened to the lever C and partake of its movement. In the first case the pinion $d$ engages with a crown or other gear wheel $o^4$, whose axis of revolution coincides with the axis of oscillation of the lever C. In this way the movement of the shaft V, the pinion $a$, crown or other gear $b$, shaft $c^3$, and pinion $d$ is transmitted to the dials without retarding or otherwise affecting the freedom of the lever C to assume any position indicative of the current strength.

I am aware that meters have been devised wherein a friction-wheel is moved across a friction-disk or other surface of varying circumference; but such meters can never be accurate for many obvious reasons. The friction of the wheel against the dial destroys the sensitiveness of the current-measuring device to an extent which renders its indications utterly unreliable. By my improvement the lever C is left entirely free and untrammeled to assume the position which indicates the correct current strength, and the registration is effected with absolute positiveness, as the teeth of the pinion U engage with the teeth of the disk T and no slip can occur. Another important advantage of my device lies in the fact that the movement of the lever C need not be the same for equal movements of current, nor need it be proportional to the current, as the teeth of the disk T may be modified and increased in number, according to any arbitrary scale of movement of the lever C.

I do not limit myself to the combination of devices as herein shown and described, as it is evident to any person skilled in the art that I may use my current measuring and registering devices with any well-known form of motor for producing a uniform speed, many of which are well known. A spring clockwork might be employed which could be wound up periodically when the readings of the meters are taken; or I can use any form of constant-speed device with my registering device and with any well-known form of current-measuring device, such as a device wherein the current strength is indicated by the mutual attraction between two energized coils, both of which might be energized by the variable current, or one might be energized by a current of constant strength and the other by the variable current. There are many old and well-known devices such as I have indicated for measuring the current strength, any of which I may use in combination with my registering device, and the manner of using them therewith will be so obvious to any person acquainted with the art that it is unnecessary to specify it.

Having thus described my invention, what I claim, and desire to secure by Letters Patent, is—

1. In an electric meter, the combination, with a solenoid and its core and a lever actuated thereby, of a revolving surface having teeth increasing in number along the generating-line of said surface, and gear carried by the lever, said gear arranged to engage with the teeth on said revolving surface, substantially as and for the purposes specified.

2. In an electric meter, the disk having a number of radially-arranged teeth or ribs of different lengths, the inner ends of said teeth constituting points in a species of spiral drawn from the center to the circumference, so that the number of teeth on a circumference of any given radius will be approximately proportional to said radius, substantially as specified.

3. In an electric meter, the combination, with a solenoid and its core, of a vibrating lever and a series of pendent weights arranged in the path of the lever, substantially as and for the purposes specified.

4. In an electric meter, a motor for the transmitting devices, said motor having in combination a solenoid with a rack on its core, a shaft actuated by the weight of said solenoid-core, and a contact device actuated by the core, substantially as and for the purposes specified.

5. The combination, in an electric meter, of transmitting devices, a motor-shaft having gearing, a solenoid having a rack on its core arranged to engage with the gearing on the motor-shaft, escapement mechanism, a contact device operated by the core of the solenoid, a pawl or detent for the escapement mechanism, and intermediate devices for operating said pawl or detent from the solenoid-core, substantially as and for the purposes specified.

6. In a meter-motor, the combination, with a shaft having a fixed pinion and a loose pinion and pawl, of a solenoid having a rack on its core, which engages with the loose pinion, said motor driven by the weight of said solenoid-core, and make-and-break devices, substantially as and for the purposes specified.

7. In a meter having a register and a vibrating lever which carries the transmitting mechanism, an interposed crown or bevel wheel having its axis coincident with the pivot of the vibrating lever, substantially as and for the purposes described.

8. In a meter having a solenoid and a vibrating lever, the combination therewith of an interposed yielding connection between the core of the solenoid and the vibrating lever of the meter, substantially as and for the purposes described.

In testimony whereof I affix my signature, in presence of two witnesses, this 19th day of July, 1890.

ALEXANDER W. MESTON.

Witnesses:
F. W. RITTER, Jr.,
WILL R. WALKER.